(12) United States Patent
Takasu

(10) Patent No.: US 9,513,858 B2
(45) Date of Patent: *Dec. 6, 2016

(54) PRINTING DEVICE, CONTROL SYSTEM, AND CONTROL METHOD OF A CONTROL SYSTEM

(71) Applicant: Seiko Epson Corporation, Tokyo (JP)

(72) Inventor: Kazuhiro Takasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,276

(22) Filed: Feb. 26, 2016

(65) Prior Publication Data

US 2016/0179444 A1 Jun. 23, 2016

Related U.S. Application Data

(63) Continuation of application No. 13/935,698, filed on Jul. 5, 2013, now Pat. No. 9,304,716.

(30) Foreign Application Priority Data

Aug. 6, 2012 (JP) ................................ 2012-173750

(51) Int. Cl.
*G06F 3/12* (2006.01)

(52) U.S. Cl.
CPC .............. *G06F 3/1238* (2013.01); *G06F 3/12* (2013.01); *G06F 3/1206* (2013.01); *G06F 3/1222* (2013.01); *G06F 3/1244* (2013.01); *G06F 3/1288* (2013.01); *G06F 3/1292* (2013.01); *G06F 3/1294* (2013.01); *G06F 3/1297* (2013.01)

(58) Field of Classification Search
CPC .... G06F 3/1238; G06F 3/1297; G06F 3/1288; G06F 3/1222; G06F 3/1206; G06F 3/1294; G06F 3/1292
USPC ................................................ 358/1.13–1.16
See application file for complete search history.

(56) References Cited

U.S. PATENT DOCUMENTS

| | | | |
|---|---|---|---|
| 2003/0081247 A1 | 5/2003 | Sharma | |
| 2004/0246514 A1* | 12/2004 | Clough | G06F 21/608 358/1.14 |
| 2006/0221368 A1 | 10/2006 | Higuchi | |
| 2008/0082677 A1 | 4/2008 | Miyazawa et al. | |
| 2009/0201526 A1* | 8/2009 | Kikuyama | G06F 21/608 358/1.14 |
| 2010/0060930 A1* | 3/2010 | Asai | G06F 21/608 358/1.15 |
| 2011/0069344 A1 | 3/2011 | Yokomizo | |
| 2011/0167277 A1* | 7/2011 | Kitamura | G06F 21/72 713/189 |

(Continued)

FOREIGN PATENT DOCUMENTS

| | | |
|---|---|---|
| JP | 5-73769 A | 3/1993 |
| JP | 2002-007288 A | 1/2002 |

(Continued)

*Primary Examiner* — Kent Yip

(57) ABSTRACT

A printer 11 can connect to a tablet device 10 that generates and transmits data using a browser function; has a communication unit 20b that receives data from the tablet device 10 on either a first logical communication channel K1 or a second logical communication channel K2 and processes the received data as required according to the communication channel; and has a print unit control unit 20a that prints based on data received by the communication unit 20b.

20 Claims, 7 Drawing Sheets

(56) References Cited

U.S. PATENT DOCUMENTS

2012/0026528 A1    2/2012  Higuchi

FOREIGN PATENT DOCUMENTS

| | | |
|---|---|---|
| JP | 2003-308196 A | 10/2003 |
| JP | 2005-026856 A | 1/2005 |
| JP | 2006-306021 A | 11/2006 |
| JP | 2006-350689 A | 12/2006 |
| JP | 2007-328558 A | 12/2007 |
| JP | 2010-219893 A | 9/2010 |
| JP | 2010-221519 A | 10/2010 |
| JP | 2011-054028 A | 3/2011 |
| JP | 2011-065595 A | 3/2011 |

* cited by examiner

PRINTING DEVICE, CONTROL SYSTEM, AND CONTROL METHOD OF A CONTROL SYSTEM

CROSS-REFERENCE TO RELATED APPLICATIONS

This application is a continuation of, and claims priority under 35 U.S.C. §120 on, application Ser. No. 13/935,698, filed Jul. 5, 2013, which claims priority under 35 U.S.C. §119 on Japanese patent application no. 2012-173750, filed Aug. 6, 2012. The content of each such related application is incorporated by reference herein in its entirety.

BACKGROUND

1. Technical Field

The present disclosure relates to a printing device that prints, a control system including the printing device and a control device connected to the printing device, and a control method of the control system.

2. Related Art

A control system (POS system) that has a printing device (POS device) and a control device (POS controller) connected to the printing device, and executes processes including recording images through the cooperation of the printing device and control device, is known from the literature. See, for example, Japanese Unexamined Patent Appl. Pub. JP-A-H05-73769.

The control system disclosed in JP-A-H05-73769 anticipates a dedicated application for controlling the printing device not being installed on the control device, and the control device controlling the printing device by using a browser function to appropriately access a specific server.

The efficiency of this printing process can be improved in this control system and the value of the system can be improved if the printing device can execute a process appropriate to the type of print data using a simple means.

SUMMARY

A printing device according to one aspect of the disclosure includes a communication unit that has a first channel that executes a data process and a second channel different from the first channel, and communicates print data on the first channel or the second channel; and a print unit that prints based on the print data communicated on the first channel or the second channel of the communication unit.

In a printing device according to another aspect of the disclosure, the data process executed on the first channel is a decryption process that decrypts the encrypted print data; and the communication unit communicates the print data on the first channel when the received print data is encrypted and decrypts the encrypted data.

Another aspect of the disclosure is a control system including: a control device having a browser execution unit that runs a web browser, and transmitting print data output by the browser execution unit on a first communication channel or a second communication channel; and a printing device having a communication unit that receives the print data transmitted by the control device on the first communication channel or second communication channel, and executes a process appropriate to the first communication channel or second communication channel, and a print unit that prints based on the print data received by the communication unit.

The control device encrypts the print data and transmits the encrypted print data on the first communication channel; and the printing device decrypts the print data transmitted on the first communication channel.

In a control system according to another aspect of the disclosure, the control device and the printing device store encryption information related to encrypting the print data; the control device encrypts the print data based on the stored encryption information and transmits the encrypted print data on the first communication channel; and the printing device decrypts the print data transmitted on the first communication channel based on the stored encryption information.

In a control system according to another aspect of the disclosure, the print unit of the printing device converts the decrypted print data to a control command that controls the print unit, and prints based on the converted control command.

Another aspect of the disclosure is a control method of a control system, the control method including steps of: a control device transmitting print data to a printing device on a first communication channel that performs a data process on the print data or a second communication channel that performs a data process different from the data process performed on the first communication channel; and the printing device printing based on the print data transmitted on the first communication channel or the second communication channel.

Another aspect of the disclosure is a program that causes a printing device to receive print data over a first communication channel that processes the received print data or a second communication channel different from the first communication channel, and to print based on the print data received over the first communication channel or the second communication channel.

Another aspect of the disclosure is a method of controlling a control system having a printing device and a control device that can communicate with the printing device, wherein the control device transmits print data output by a browser execution unit that runs a web browser through a first communication channel or a second communication channel, and the printing device receives the print data sent by the control device through the first communication channel or second communication channel, processes the data as required according to the communication channel that was used, and prints based on the received print data.

Objects of the present invention are also met in a control system including: a hardware controller that runs a web browser, encrypts select print data output by the web browser, does not encrypt other print data output by the web browser, and transmits the encrypted print data and the non-encrypted print data on a transmission channel; and a printer including a receiver and a print controller, wherein: the receiver receives the encrypted print data and the non-encrypted print data transmitted by the hardware controller on the transmission channel; the receiver includes a first reception channel and a second reception channel different from the first reception channel; the received encrypted print data is directed to the first reception channel and the received non-encrypted data is directed to the second reception channel; the first reception channel decrypts the received encrypted data; the receiver communicates the decrypted print data from the first reception channel and the non-encrypted data from the second reception channel; and the print controller controls printing based on the decrypted print data communicated from the first reception channel and the non-encrypted print data communicated from the second reception channel of the receiver; and wherein prior to transmitting the encrypted print data and the non-encrypted print data, the hardware controller adds a flag indicator to the encrypted print data and to the non-encrypted print data identifying it as encrypted print data or non-encrypted print data, respectfully.

Preferably, the hardware controller and the printer store encryption information related to encryption of the print data; the hardware controller encrypts the select print data based on the stored encryption information; and the printer decrypts the received encrypted print data in the first reception channel based on the stored encryption information.

Additionally, the print controller may convert the decrypted print data to a control command to control the print controller, and print based on the converted control command.

Also, the hardware controller may compress the encrypted print data at a first compression rate and transmit the compressed encrypted print data on the transmission channel. In this case, the hardware controller may also compress the non-encrypted print data at a second compression rate that is different from the first compression rate, and transmit the compressed non-encrypted print data on the transmission channel.

Further preferably the printer is connected to a host computer via the hardware controller; and the hardware controller transmits data from the host computer to the printer on the transmission channel.

It is also preferred that the printer be coupled to a data hardware processor different from the hardware controller; and that the hardware controller transmit data for the data hardware processor connected to the printer on the transmission channel.

In a particular embodiment, the hardware controller is a POS terminal having a display that displays product information; and the printer produces a receipt based on information processed by the POS terminal.

Preferably, the receiver inspects the flag indicator of the received encrypted print data and the received non-encrypted print data, and directs the received encrypted print data and non-encrypted print data to the appropriate one of the first reception channel and second reception channel based on the flag indicator.

It is preferred that the encrypted print data and the non-encrypted print data each be print jobs controlling printing by the printer; that the flag be embedded within the encrypted print data and within the non-encrypted print data; that if the flag identifies print data received by the printer as encrypted print data, then the receiver direct the received print data to the first reception channel; and that if the flag identifies print data received by the printer as non-encrypted print data, then the receiver direct the received print data to the second reception channel.

Objects of the present invention also met in a control method of a control system, comprising: a hardware controller transmitting print data via a transmission channel, the transmission channel transmitting encrypted print data and non-encrypted print data; and a printer printing based on the encrypted print data and the non-encrypted print data transmitted on the transmission channel; wherein: the transmitted encrypted print data and the transmitted non-encrypted print data include a flag indicator identifying it as encrypted print data or non-encrypted print data, respectfully; and the printer distinguishes between received encrypted print data and received non-encrypted print data based on their flag indicator.

Preferably, the printer has a first reception channel receiving the encrypted print data transmitted on the transmission channel and decrypting the received encrypted print data, and prints based on the decrypted print data.

Further preferably, the printer has a second reception channel receiving the non-encrypted print data transmitted on the transmission channel; and prints based on the received non-encrypted print data without decrypting print data received by the second reception channel.

Additionally, the hardware controller may compress the encrypted print data at a first compression rate, and transmit the compressed encrypted print data on the transmission channel. In this case, the hardware controller may compress the non-encrypted print data at a second compression rate that is different from the first compression rate, and transmit the compressed non-encrypted print data on the transmission channel.

Preferably, the encrypted print data and non-encrypted print data transmitted on the transmission channel are both print jobs; the transmission channel embeds the flag into its transmitted print data identifying it as encrypted print data or non-encrypted print data; if the flag embedded within printing data received by the printer identifies the received printing data as encrypted print data, then the printer decrypts the received print data prior to printing based on the received print data; if the flag embedded within printing data received by the printer identifies the received printing data as non-encrypted print data, then the printer does not decrypts the received print data prior to printing based on the received print data.

Objects of the present invention are also met in a printer including: a receiver and a print controller, wherein: the receiver is configured to receive encrypted print data and non-encrypted print data transmitted on a transmission channel by a web browser; the receiver includes a first reception channel and a second reception channel different from the first reception channel; the received encrypted print data is directed to the first reception channel and the received non-encrypted data is directed to the second reception channel; the first reception channel decrypts the received encrypted data; the receiver communicates the decrypted print data from the first reception channel and the non-encrypted data from the second reception channel; the print controller is configured to print based on the decrypted print data communicated from the first reception channel and the non-encrypted print data communicated from the second reception channel of the receiver; and the received encrypted print data includes a first flag indicator identifying it as encrypted print data and the received non-encrypted print data includes a second flag indicator identifying it as non-encrypted print data.

DESCRIPTION OF EMBODIMENTS

A preferred embodiment of the present disclosure is described below with reference to the accompanying figures.
Embodiment 1

Figure 1:
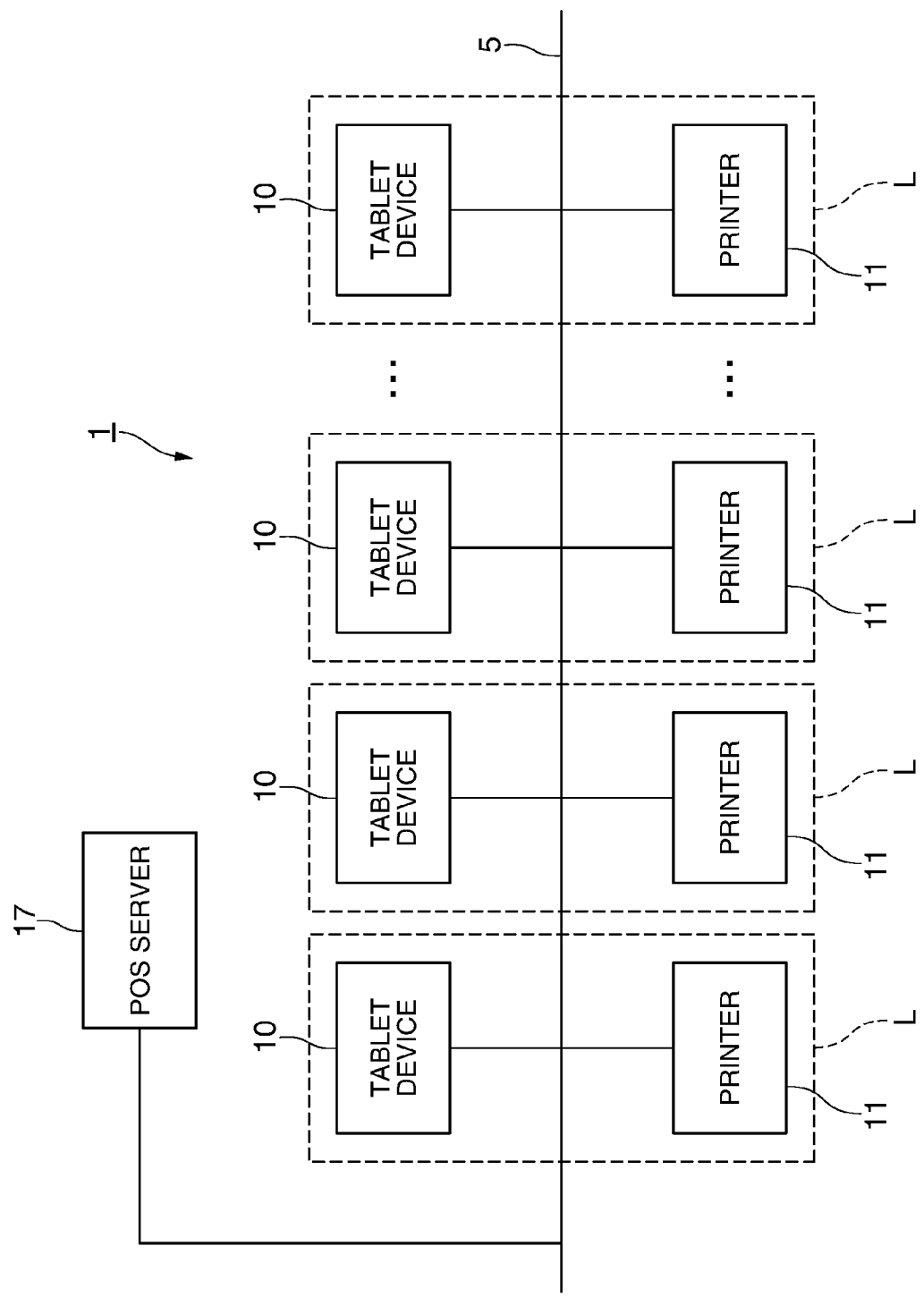
FIG. 1 is a block diagram showing the configuration of a control system according to a first embodiment of the disclosure.
Figure 2:
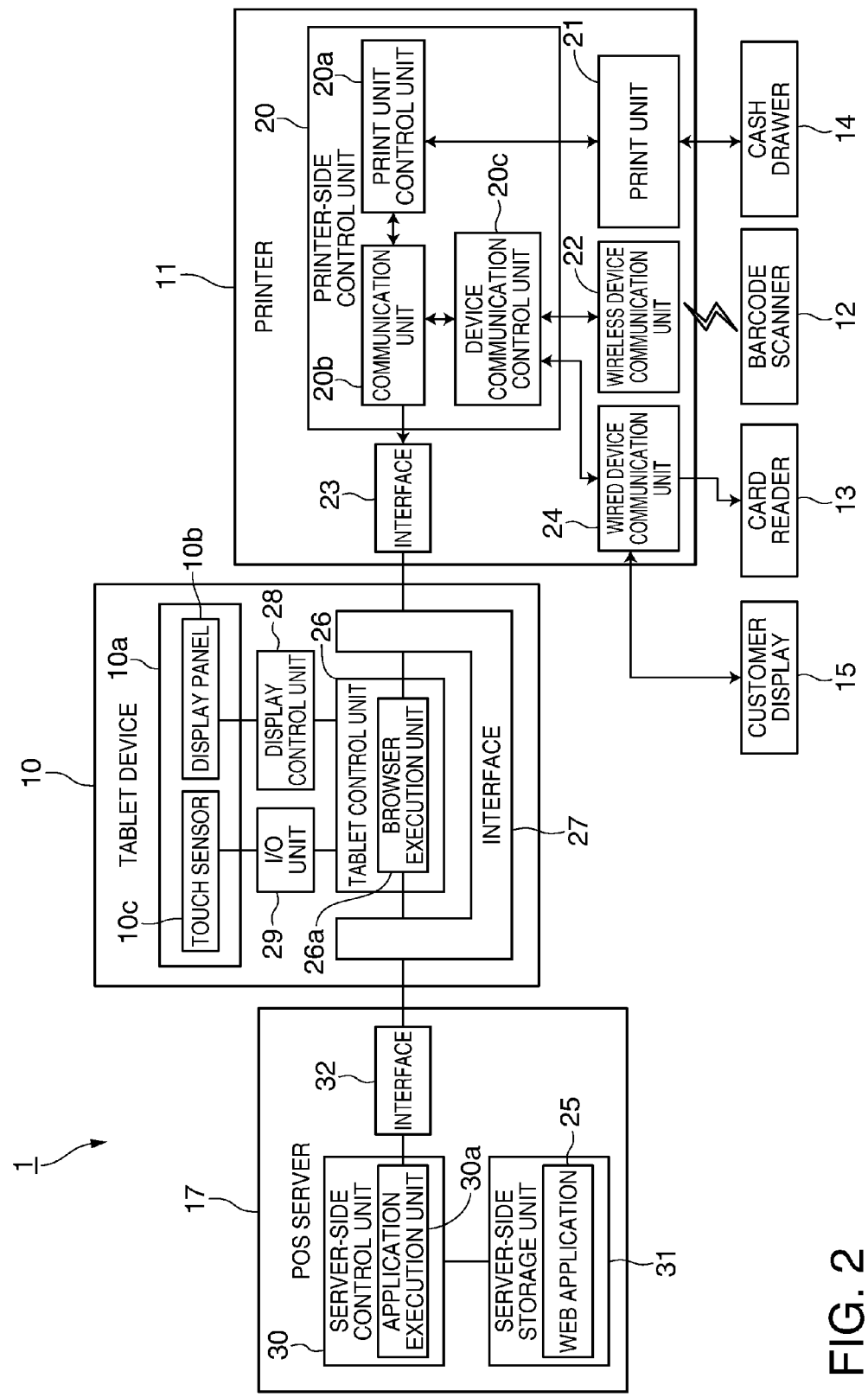
FIG. 2 is a block diagram showing the functional configuration of the control system.

FIG. 1 is a block diagram showing the configuration of a control system 1 according to a preferred embodiment of the disclosure. FIG. 2 is a block diagram showing the functional configuration of a tablet device 10, printer 11, and POS (point-of-sale) server 17 in the control system 1.

The control system 1 is an example of a POS system used in a retail store in a shopping center or department store, or in other types of businesses. The main functions of the control system 1 are, for example, managing product sales, product inventory, and sales trends in the store, processing sale transactions at checkout counters L in the store according to the products purchased by a customer, and producing receipts based on the payment received from the customer.

Multiple checkout counters L where sale transactions are processed are located in a store where the control system 1 shown in FIG. 1 is used, and a tablet device 10 (control device), and a printer 11 (printing device) connected to the tablet device 10, are installed at each checkout counter L. The tablet device 10 and printer 11 are connected so that they can communicate through a communication line 5. The communication line 5 in this embodiment is a wired or wireless communication channel conforming to the Ethernet® standard, but is not so limited if data can be communicated between devices connected to the communication line 5.

Figure 3:
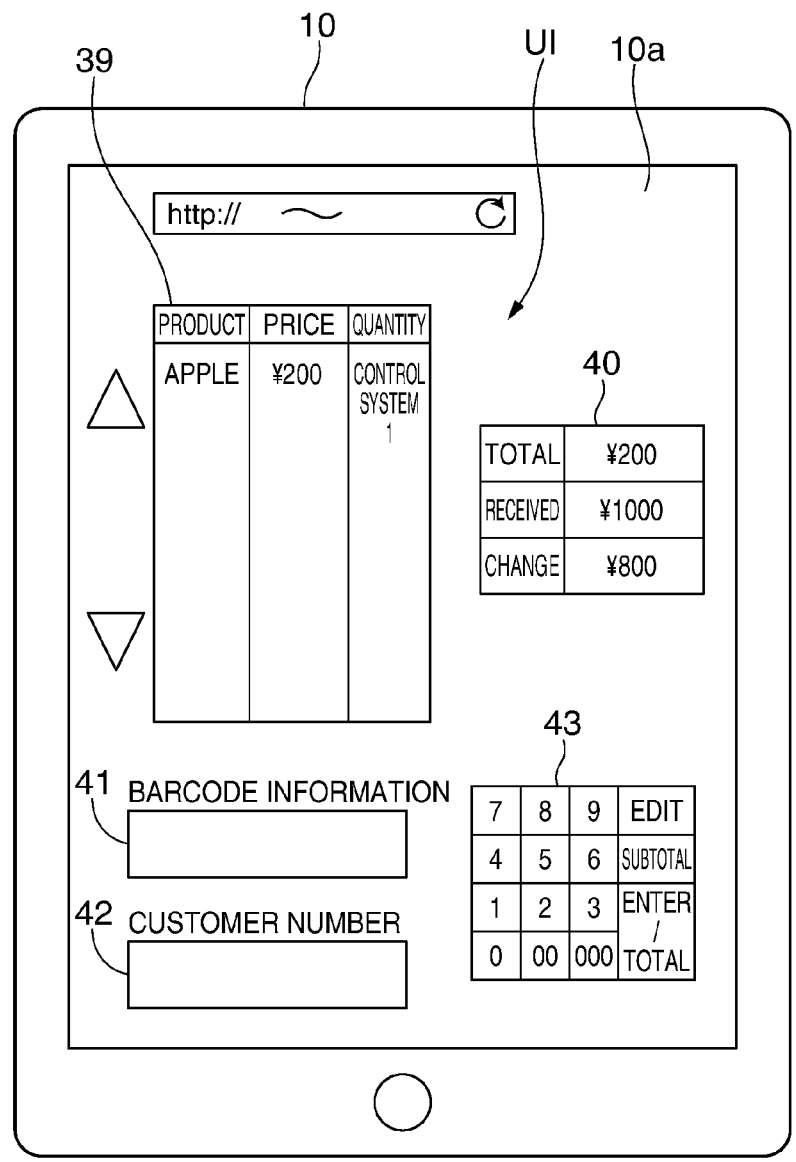
FIG. 3 shows an example of a window displayed on a tablet device.

The tablet device 10 is a tablet computer. As shown in FIG. 3 and described below, the tablet device 10 in this embodiment has a touch panel 10a covering substantially the entire front surface.

The touch panel 10a includes a touch sensor 10c that detects touch operations layered over and formed in unison with a display panel 10b as a display screen. Because the tablet device 10 operates by detecting user touches with the touch sensor 10c, there is no need to connect an external keyboard or display panel to the tablet device 10.

The printer 11 may be a thermal printer that prints on thermal roll paper, or a dot impact printer, for example. The printer 11 produces a receipt based on data input from the tablet device 10.

Connected to the printer 11 are external devices such as a barcode scanner 12 for reading barcodes on products or product packaging, a card reader 13 for reading credit cards or preferred customer cards, a cash drawer 14 for holding cash, checks, or other payment instruments, and a customer display 15 for displaying transaction data for the customer. The card reader 13 could be used to read magnetic information recorded on a magnetic stripe card, or to read and write information to an IC card.

The barcode scanner 12 connects to a printer 11 by short-range wireless communication conforming to the Bluetooth® standard. The card reader 13 connects to the printer 11 by a wired communication standard such as USB. The cash drawer 14 and customer display 15 connect to the printer 11 by wired communication standards, such as RS-232C and USB, respectively, in this embodiment. The barcode scanner 12, card reader 13, cash drawer 14, and customer display 15 respectively exchange data and signals with the printer 11 according to predetermined communication protocols.

The printer 11 includes a printer-side control unit 20, print unit 21, wireless device communication unit 22, wired device communication unit 24, and printer interface 23.

The printer-side control unit 20 controls various parts of the printer 11, and includes a CPU, RAM, ROM, and other peripheral circuits not shown. Programs installed to the printer 11 include a program for controlling the print unit 21, and a program for communicating with the tablet device 10 according to a specific protocol. The printer-side control unit 20 includes a print unit control unit 20a that controls the print unit, and a communication unit 20b that executes the communication program and communicates with the tablet device 10.

The print unit 21 prints an image on the roll paper and then cuts the roll paper, producing a receipt. The print unit 21 includes a print mechanism including a control circuit that controls the printing operation, a conveyance mechanism that conveys the roll paper, and a recording head, and prints text and images on roll paper, and a paper cutter mechanism that cuts the roll paper. In this embodiment the print unit control unit 20a and the print unit 21 work together and function as a print unit.

The wireless device communication unit 22 communicates by Bluetooth short-range wireless communication with the barcode scanner 12, and includes a link manager, link controller, high frequency circuit, and antenna.

The device communication control unit 20c reads and runs a Bluetooth Driver Stack to control Bluetooth hardware. The device communication control unit 20c controls the wireless device communication unit 22 and communicates with the barcode scanner 12 by short-range wireless communication.

Of the input devices, the wired device communication unit 24 communicates with at least the card reader 13 and customer display 15 by a specific communication protocol. The wired device communication unit 24 includes a network interface card connected to a physical port. The wired device communication unit 24 communicates data and signals with the card reader 13 and customer display 15 as controlled by the device communication control unit 20c of the printer-side control unit 20.

The printer interface 23 connects to the communication line 5 (FIG. 1), and exchanges data with the tablet device 10 as controlled by the printer-side control unit 20.

The tablet device 10 includes a tablet control unit 26, tablet interface 27, display control unit 28, I/O unit 29, and touch panel 10a.

The touch panel 10a includes a display panel 10b on the front side of the tablet device 10 as shown in FIG. 3, and a touch sensor 10c disposed in unison with the display panel 10b. The display panel 10b is a flat panel display such as an LCD panel, OLED panel, ore-paper, and is driven by the display control unit 28.

The touch sensor 10c is on the surface of the tablet device 10. The surface of the touch sensor 10c may be covered with glass or a plastic sheet. The touch sensor 10c may be a capacitive or resistive sensor, detects touches by the user's finger or a stylus, and outputs a signal indicating the position where the operation was detected to an I/O unit 29.

The display control unit 28 drives the display panel 10b based on display data input from the browser execution unit 26a, and displays an image including text or graphic on the display panel 10b.

The I/O unit 29 detects touch operations on the touch panel 10a based on signals output by the touch sensor 10c. When a touch operation is detected, the I/O unit 29 generates coordinate data identifying the coordinates of the position on the display panel 10b that was touched, and outputs to the browser execution unit 26a.

The tablet control unit 26 controls various parts of the tablet device 10, and includes a CPU, RAM, ROM, and other peripheral circuits not shown. The tablet control unit 26 includes a browser execution unit 26a that renders functions of a common web browser by running a browser program. The browser execution unit 26a functions as a web browser by executing a browser program.

Through a function of the web browser, the browser execution unit 26a downloads a web page written in a scripting language or markup language such as HTML from the POS server 17. Data for the downloaded web page is stored, for example, in RAM not shown. Using a function of the web browser, the browser execution unit 26a reads the data for the downloaded web page, and generates and outputs display data for displaying the web page to the display control unit 28. The browser execution unit 26a executes processes independently or in conjunction with the application execution unit 30a of the POS server 17 by means of a function of a script embedded in the web page.

When a touch operation on the touch sensor 10c is detected by the I/O unit 29, the browser execution unit 26a determines the input content based on the coordinate data input from the I/O unit 29 according to the touch operation, and the display data output to the display control unit 28. Based on the identified input content, the browser execution unit 26a appropriately executes a process by a function of the script, and sends data indicating the identified input content to the POS server 17. The application execution unit 30a executes processes based on the input data. The browser execution unit 26a receives data indicating the result of the application execution unit 30a executing the web application program from the POS server 17, and generates and outputs display data reflecting the received data to the display control unit 28.

The tablet interface 27 communicates with the printer 11 and POS server 17 according to a specific communication protocol as controlled by the tablet control unit 26. The tablet device 10 could communicate with the printer 11 and POS server 17 through a wired connection, but communicating through a wireless connection is preferable in order to effectively utilize the mobility of the tablet device 10.

The POS server 17 has a database storing product information, a database for managing sales, and a database for managing product inventory, and uses these databases to manage the control system 1.

The POS server 17 includes a server-side control unit 30, server-side storage unit 31, and server interface 32.

The server-side control unit 30 controls various parts of the POS server 17, and includes a CPU, RAM, ROM, and other peripheral circuits. The server-side storage unit 31 is a hard disk, EEPROM, or other nonvolatile memory device, and stores data rewritably. The server interface 32 communicates with the tablet device 10 according to a specific communication protocol as controlled by the server-side control unit 30.

A web application 35 is stored so that it can be loaded from the server-side storage unit 31. The application execution unit 30a of the server-side control unit 30 is a function block that executes the web application 35.

The web application 35 is a program that executes processes required for the control system 1 to operate as a POS system.

The application execution unit 30a generates or reads from the server-side storage unit 31 data for the web page requested by the tablet device 10, and sends the data to the tablet device 10. When data requesting executing the web application 35 and transaction process data to be processed by the web application 35 are sent from the tablet device 10, the application execution unit 30a receives the data through the server interface 32. The application execution unit 30a executes the transaction process based on the data from the tablet device 10 by running the web application 35, and sends the result of the transaction process to the tablet device 10.

The basic operation of the components of this control system 1 when executing a transaction process is described next.

The tablet device 10 executes the following process before the transaction process is performed.

The cash register operator or other person first starts the browser of the tablet device 10 and displays a dedicated user interface UI on the touch panel 10a. The browser execution unit 26a of the tablet control unit 26 then accesses a specific address on the POS server 17, acquires an HTML file or other screen drawing file, and displays the dedicated user interface UI based on the acquired file. A program with a function for executing a transaction process in conjunction with the application execution unit 30a of the POS server 17 is embedded in this screen drawing file using a specific scripting language.

FIG. 3 shows an example of the dedicated user interface UI displayed on the touch panel 10a.

A display list area 39 for displaying the name, price, and quantity of the products purchased by the customer is presented in the top left part of the dedicated user interface UI shown in FIG. 3. Amount fields 40 for displaying and inputting the total of the products purchased by the customer, the amount of money received from the customer for the transaction, and the amount of change due to the customer, is presented on the right beside the display list area 39.

Below the display list area 39 is a barcode data field 41 where the information represented by the barcode that is read with the barcode scanner 12 ("barcode information") is input and displayed. The barcode information is basically identification information assigned to each product type.

Below the barcode data field 41 is a customer number field 42 where the customer number acquired by reading a frequent customer card, for example, with the card reader 13 is input and displayed.

A virtual keypad 43 is displayed on the right beside the barcode data field 41 and customer number field 42. Information can be entered using this virtual keypad 43 to the various fields displayed in the dedicated user interface UI, and the virtual keypad 43 has all keys required for data entry.

An address field 44 where the accessed address is displayed is presented at the top of the dedicated user interface UI.

Figure 4:
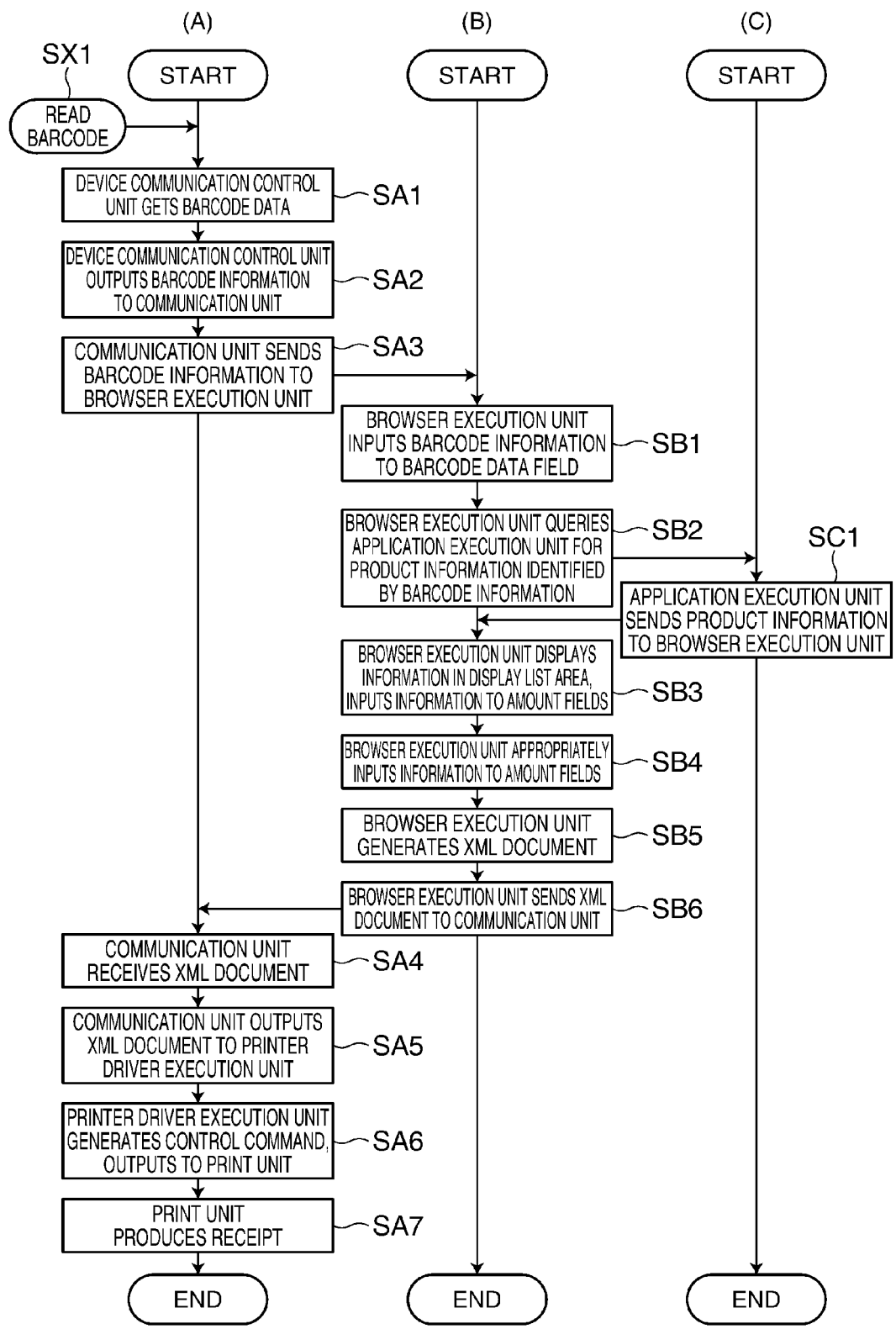
FIG. 4 is a flow chart of the operation of the control system.

The basic operation performed when the devices of the control system 1 described above process a transaction is described next with reference to the flow chart in FIG. 4 using a transaction in which a customer purchases a single product as an example. In FIG. 4 the left column A shows the operation of the printer 11, the middle column B shows the operation of the tablet device 10, and the right column C shows the operation of the POS server 17.

At the checkout counter L the operator first scans the barcode of the one product using the barcode scanner 12 (step SX1).

The device communication control unit 20c of the printer-side control unit 20 thus acquires the data captured by the barcode scanner 12 through the wireless device communication unit 22 (step SA1). The device communication control unit 20c then generates data representing the barcode information based on the acquired barcode data, and outputs the data representing the barcode information to the communication unit 20b (step SA2). Following the specific protocol, the communication unit 20b sends the data representing the barcode information to the browser execution unit 26a of the tablet device 10 (step SA3).

When the data representing the barcode information is input, the browser execution unit 26a of the tablet control unit 26 of the tablet device 10 displays the barcode information in the barcode data field 41 using a function of a program ("dedicated script") embedded in the HTML file for the dedicated user interface UI (step SB1). Next, using a function of the dedicated script, the browser execution unit 26a communicates with the application execution unit 30a of the POS server 17 and requests the name and price of the product identified by the barcode information (step SB2). Through a function of the web application 35, the application execution unit 30a accesses the appropriate database based on the query to retrieve the required information, and outputs the acquired information to the browser execution unit 26a of the tablet device 10 (step SC1).

Through a function of the dedicated script, the browser execution unit 26a of the tablet device 10 displays the name, price, and quantity of the product selected by the customer in the display list area 39, and displays the total of the products selected by the customer in the appropriate amount field 40 (step SB3).

When the operator then performs an operation finalizing the products to be processed in the transaction using the virtual keypad 43, receives payment from the customer, and issues change, the browser execution unit 26a communicates appropriately with the application execution unit 30a through a function of the dedicated script, and displays the appropriate information in the corresponding amount fields 40 (step SB4).

Next, through a function of the dedicated script, the browser execution unit 26a generates an XML document (print data) containing information related to the receipt to be produced by the print unit 21 (step SB5). This XML document contains the information required to produce the receipt, including text and graphic information to be printed on the receipt, in a specific format.

The browser execution unit 26a then sends the generated XML document using a method described below to the communication unit 20b of the printer 11 according to a specific protocol (step SB6).

The communication unit 20b of the printer 11 receives the XML document (step SA4) using the method described below, and outputs to the print unit control unit 20a (step SA5).

Based on the input XML document, the print unit control unit 20a generates and outputs to the print unit 21 a control command using the command language of the print unit 21 that causes the print unit 21 to execute the processes required to produce a receipt (step SA6). The control circuit of the print unit 21 controls the relevant mechanisms based on the control command and produces a receipt (step SA7).

To produce a receipt in this embodiment of the disclosure, the tablet device 10 generates and sends an XML document containing the information for the receipt to the printer 11 (steps SB5, SB6 in FIG. 4), and the printer 11 then produces (prints) the receipt based on the received XML document (steps SA4 to SA7 in FIG. 4).

Depending on the XML document sent from the tablet device 10 to the printer 11, encryption may or may not be required for communication. More specifically, when communicating or printing information related to the customer's credit card or other personal information that should not be leaked to third parties, the XML document must be specifically encrypted to prevent data theft (leaking) during communication. However, if confidential information that should not leak out is not printed on the receipt, there is no need to encrypt the XML document for communication, efficiency is improved by not using encryption, and the total processing time can be shortened.

As a result, the tablet device 10 and printer 11 according to this embodiment of the disclosure communicate using a method appropriate to the data being communicated as described below.

Figure 5:
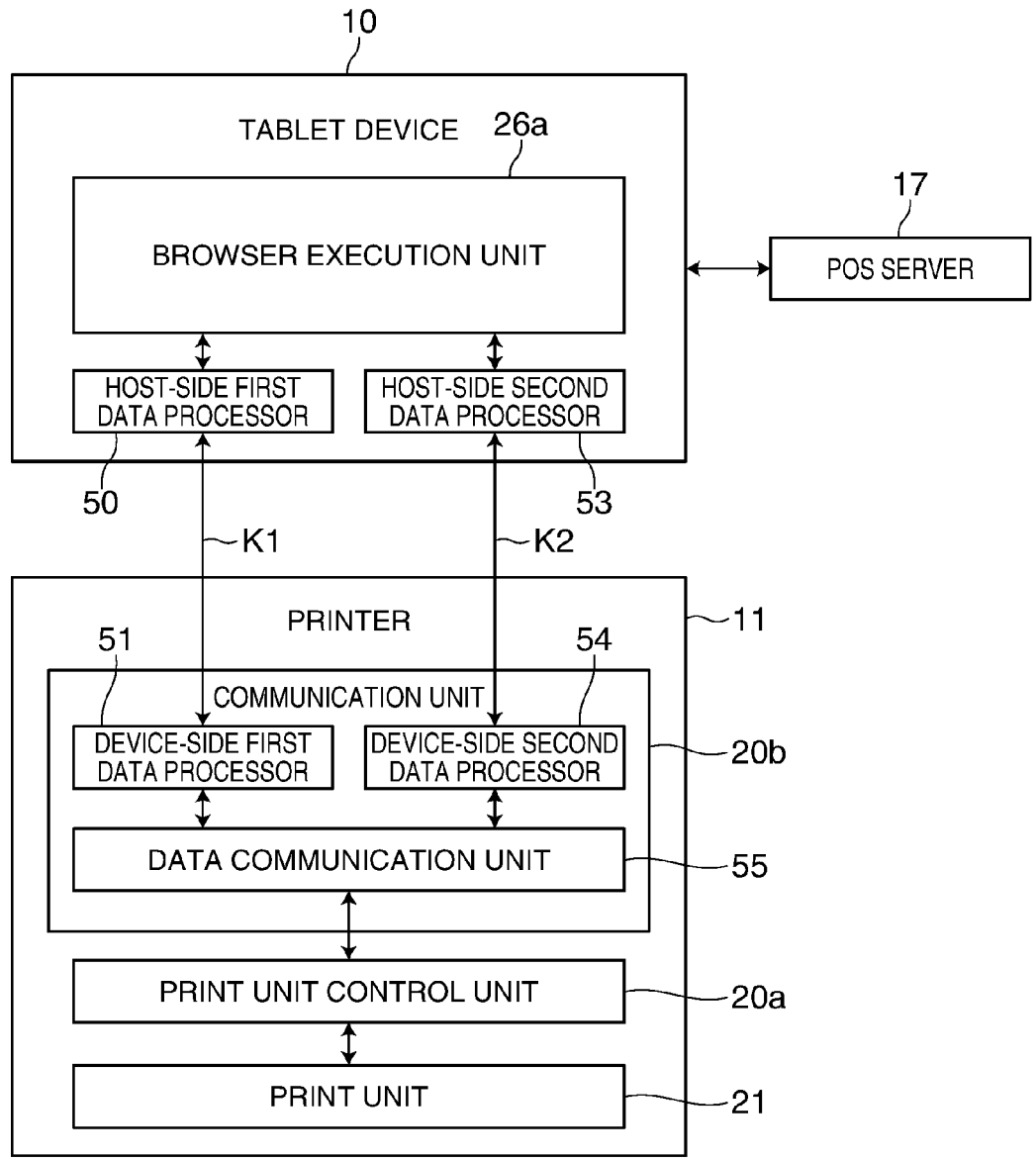
FIG. 5 is a block diagram showing the function configuration of main parts of the control system.

FIG. 5 is a block diagram showing the main functional configuration of the tablet device 10 and printer 11.

As shown in FIG. 5, the tablet device 10 and printer 11 open two logical channels for communicating data between the devices, a first logical communication channel K1 (first communication channel) and a second logical communication channel K2 (second communication channel).

The first logical communication channel K1 and second logical communication channel K2 are further described below.

The first logical communication channel K1 is a logical communication channel for carrying encrypted data when the XML document or other data is encrypted for communication. The browser execution unit 26a and communication unit 20b open the first logical communication channel K1 as described below.

First, the browser execution unit 26a and communication unit 20b open a connection using the WebSocket protocol between the host-side first data processor 50 and device-side first data processor 51. The host-side first data processor 50 and device-side first data processor 51 are function blocks for a virtual interface used for data communication based on the WebSocket protocol. While the first logical communication channel K1 is a communication channel based on the WebSocket protocol in this embodiment, the Comet Protocol or other standard could be used instead.

The browser execution unit 26a and communication unit 20b then communicate over the opened connection, and generate and acquire a shared key used to encrypt and decrypt data carried on the first logical communication channel K1. The shared key can be generated using the Diffie-Hellman key exchange or other method. The browser execution unit 26a then stores the shared key to a specific variable, for example, defined in the program rendering the host-side first data processor 50 function, and renders the data encryption/decryption function using the shared key in the host-side first data processor 50. This process is a process of storing print data sent by the control device and received by the printing device in encrypted form.

The communication unit 20b likewise renders a data encryption/decryption function using a shared key in the device-side first data processor 51.

A first logical communication channel K1 is thus established between the host-side first data processor 50 and device-side first data processor 51, the XML document generated by the browser execution unit 26a is then encrypted by the host-side first data processor 50 using the shared key and output to the device-side first data processor 51 over the first logical communication channel K1, and is then decrypted by the device-side first data processor 51 using the shared key. Data flowing over the first logical communication channel K1 is thus data that is encrypted using a shared key.

The second logical communication channel K2 is a logical channel carrying unencrypted data when the XML document or other data is not encrypted.

In this instance, the browser execution unit 26a and communication unit 20b open the second logical communication channel K2, which is a communication channel based on the HTTP protocol, for example, between the host-side second data processor 53 and device-side second data processor 54. When sending an XML document over the second logical communication channel K2, the host-side second data processor 53 sends the XML document through the second logical communication channel K2 to the device-side second data processor 54 using the HTTP protocol, for example.

This embodiment thus opens two channels between the tablet device 10 and printer 11, a first logical communication channel K1 that carries encrypted data, and a second logical communication channel K2 that carries unencrypted data.

This embodiment can therefore transmit data using the method appropriate to the type of data, and the method of communicating data can be varied according to the type of data, by changing the channel through which the data is communicated according to the type of data, such as whether the data to be communicated contains personal information.

Operation of the tablet device 10 and printer 11 when sending and receiving an XML document using the first logical communication channel K1 or the second logical communication channel K2 is described next.

Figure 6:
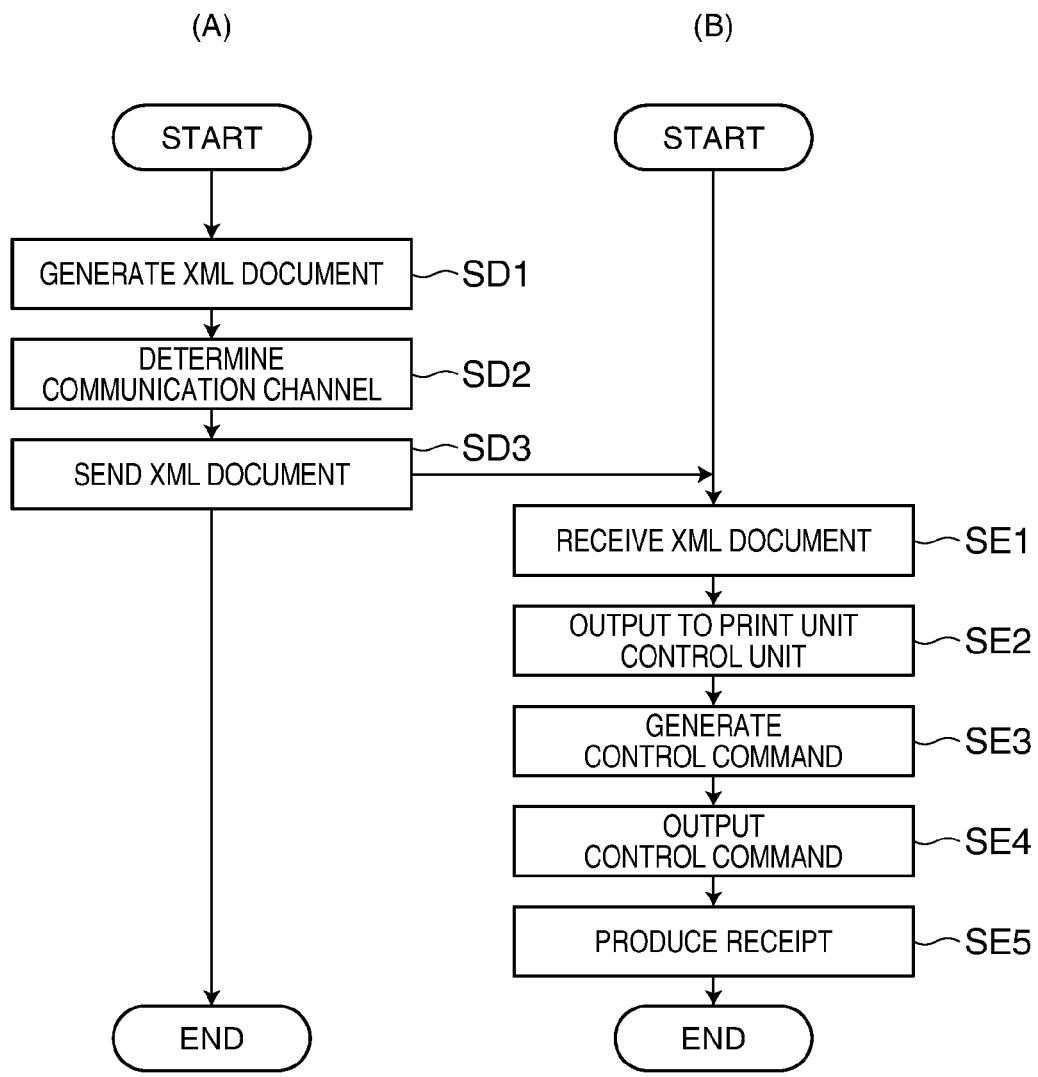
FIG. 6 is a flow chart of the operation of the control system.

FIG. 6 is a flow chart showing in further detail the process from when the tablet device 10 generates the XML document until the printer 11 produces a receipt based on the XML document (that is, steps SB5 and SB6, and steps SA4 to SA7, in FIG. 4). In FIG. 6 column A shows the operation of the tablet device 10, and column B shows the operation of the printer 11.

Using a function of the dedicated script, the browser execution unit 26a of the tablet device 10 generates an XML document containing the information required to produce a receipt in a specific format (step SD1).

The browser execution unit 26a then determines whether to send the generated XML document over the first logical communication channel K1 or the second logical communication channel K2 (step SD2). The decision of step SD2 is made as described below.

In one implementation the user can set whether to send data over the first logical communication channel K1 or the second logical communication channel K2, and the browser execution unit 26a decides based on the user setting whether to use the first logical communication channel K1 or second logical communication channel K2. In this instance the user can appropriately determine whether or not to use encrypted communication based on knowledge of the information to be exchanged between the tablet device 10 and printer 11.

Alternatively, the browser execution unit 26a could analyze the content of the XML document by referencing the value of a certain flag in the XML document, for example, to determine if information that should be protected from leaking is contained in the XML file and select the first logical communication channel K1 or second logical communication channel K2 accordingly. This implementation improves user convenience because there is no need for a setting made by the user, effectively suppresses encrypting data that does not require encryption, and can improve process efficiency.

The browser execution unit 26a then sends the XML document to the communication unit 20b of the printer 11 using the channel selected in step SD2 (step SD3). As described above, when the first logical communication channel K1 is used, the XML document is encrypted using the shared key by the host-side first data processor 50, output over the first logical communication channel K1 to the device-side first data processor 51, and then decrypted using the shared key by the device-side first data processor 51. When the second logical communication channel K2 is used, the XML document is sent from the browser execution unit 26a to the communication unit 20b over the second logical communication channel K2 using the HTTP protocol without encryption.

The data communication unit 55 of the communication unit 20b of the printer 11 then receives the transmitted XML file through the device-side first data processor 51 or device-side second data processor 54 (step SE1), processes the data as needed, and outputs to the print unit control unit 20a (step SE2).

Based on the input XML document, the print unit control unit 20a generates a control command in the command language of the print unit 21 (step SE3). The control command generated here is a command group that reflects print settings such as the print speed, print density, and margins, and causes the print unit 21 to execute the processes related to producing a receipt. The function of generating control commands based on the XML document is rendered by a dedicated program (script) containing an algorithm with the appropriate function.

The print unit control unit 20a then outputs the generated control command to the print unit 21 (step SE4). The control circuit of the print unit 21 controls the appropriate mechanisms based on the control command and produces a receipt (step SE5).

As described using FIG. 6, the tablet device 10 in this embodiment of the disclosure changes the communication channel according to the type of data when sending an XML document to produce a receipt, and the communication unit 20b receives the XML document over either the first logical communication channel K1 or second logical communication channel K2 and processes the received XML document according to the communication channel that was used. Data can therefore be sent and received appropriately according to the type of data using two channels, a first logical communication channel K1 and a second logical communication channel K2.

As described above, the control system 1 according to this embodiment of the disclosure includes a tablet device 10 that generates and sends data using a browser function, and a printer 11 that can connect to the tablet device 10. The tablet device 10 transmits data using one of a plurality of channels that carry different types of data; the communication unit 20b of the printer 11 receives the data through the selected channel and processes the data according to the selected communication channel; and the print unit control unit 20a functioning as a print unit records based on the data received by the communication unit 20b.

The tablet device 10 in this embodiment transmits over a first communication channel or a second communication channel according to the type of data, and the printer 11 receives the print data and prints after processing the print data appropriately to the communication channel that was used. As a result, if the tablet device 10 and printer 11 communicate over the first or second communication channel according to the type of print data, the printer 11 can execute a process and print appropriately according to the type of print data.

This embodiment also enables data communication between the tablet device 10 and printer 11 using one of a plurality of communication channels according to the type of data, and can diversify the method used for data communication between devices.

The tablet device 10 in this embodiment sends encrypted data (XML document) through the first logical communication channel K1 to the printer 11, the communication unit 20b of the printer 11 decrypts the data received through the first logical communication channel K1, and the print unit control unit 20a records based on the data decrypted by the communication unit 20b.

Data requiring encryption can thus be received through the first logical communication channel K1, data not requiring encryption can be sent and received through a different channel, and the devices can easily switch between encrypting and not encrypting data for communication.

The browser execution unit 26a of the tablet device 10 and the communication unit 20b of the printer 11 in this embodiment determine the encryption applied to data to be communicated over the first logical communication channel K1 according to a specific rule. The browser execution unit 26a of the tablet device 10 then sends the data (XML document) encrypted according to the determined encryption method over the first logical communication channel K1 to the printer 11, and the communication unit 20b of the printer 11 decrypts the data received through the first logical communication channel K1 using the determined encryption method.

Data communicated over the first logical communication channel K1 can thus be reliably encrypted using a method enabling decryption on the printer 11 side. The encryption method in this embodiment generates a shared key, but generating the shared key is not limited to using a digital certificate issued by an external authority. This implementation does not incur a licensing fee for a digital certificate to build and operate the control system 1, and is therefore cost effective.

The tablet device 10 in this embodiment sends an encrypted markup document (XML document) for printing to the printer 11 through the first logical communication channel K1. The communication unit 20b of the printer 11 decrypts the XML document received through the first logical communication channel K1, and outputs the decrypted XML document to the print unit control unit 20a. The print unit control unit 20a then converts the XML document to control commands for the print unit 21, outputs the control commands to the print unit 21, and the print unit 21 produces a receipt.

When sending a markup document for printing from the tablet device 10 to the printer 11, this embodiment enables appropriately encrypting and then transmitting the markup document as needed using the simple means of changing the transmission channel to the first logical communication channel K1.

Embodiment 2

A second embodiment of the disclosure is described next.

Figure 7:
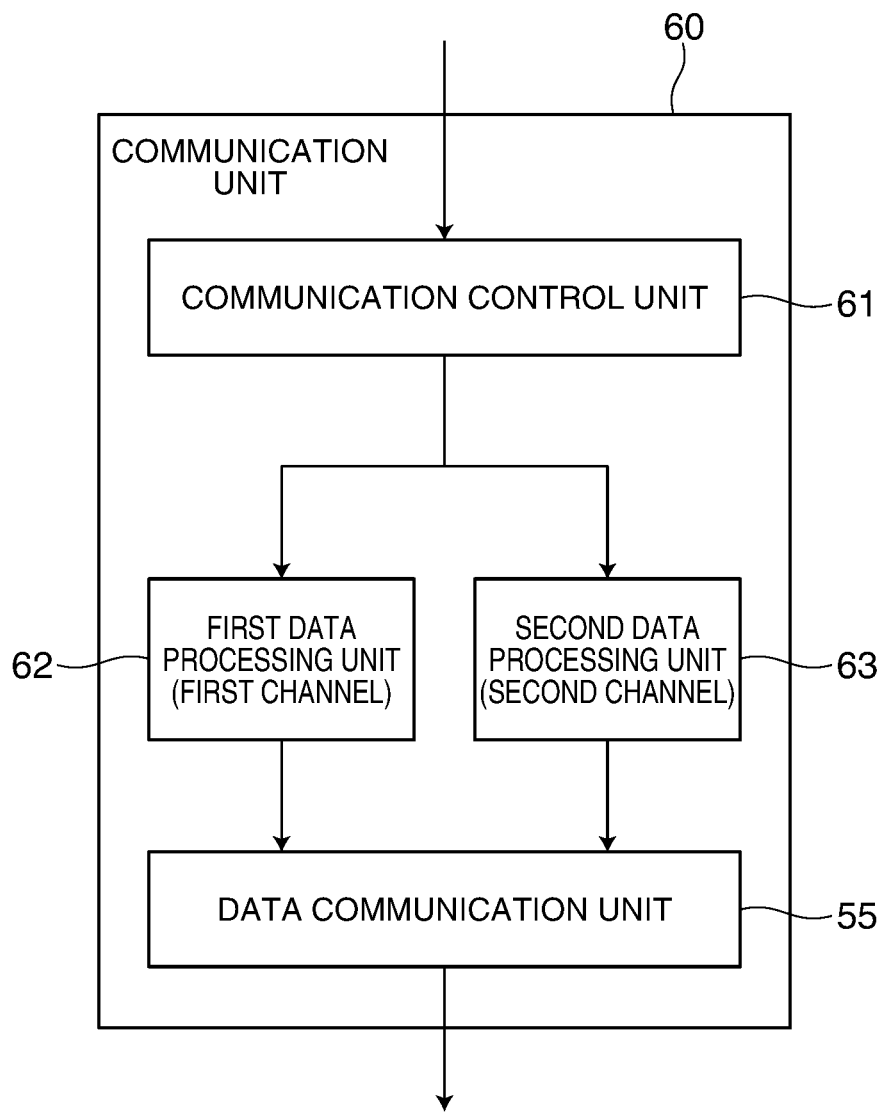
FIG. 7 is a block diagram showing main parts of a printer according to a second embodiment of the disclosure.

FIG. 7 is a block diagram showing the functional configuration of the communication unit 60 (a function block corresponding to the communication unit 20b in the first embodiment) in a printer 11 according to this embodiment of the disclosure.

As shown in FIG. 7, the communication unit 60 according to this embodiment of the disclosure has a communication control unit 61, a first data processing unit 62 (first channel), and a second data processing unit 63 (second channel).

The first data processing unit 62 is a processing unit with at least a function of executing a process related to receiving encrypted data after decrypting the data by the same specific encryption method used to encrypt the data. The second data processing unit 63 is a processing unit with at least a function of executing a process for receiving data that is not encrypted.

Operation of the communication unit 60 according to this embodiment of the disclosure when print data is received is described next.

Print data received from a host computer such as a tablet device 10 according to the first embodiment of the disclosure is input to the communication control unit 61 of the communication unit 60. The communication control unit 61 then determines if the input print data is encrypted data or unencrypted data. For example, a flag identifying whether or not the data is encrypted could be stored in a specific part of the print data, and the communication control unit 61 determine if the data is encrypted based on this flag.

If the print data is encrypted, the communication control unit 61 outputs the print data to the data communication unit 55 through the first data processing unit 62 (first channel), but outputs the print data through the second data processing unit 63 (second channel) to the data communication unit 55 if the print data is not encrypted. As described in the first embodiment, the data communication unit 55 processes the input data as required before outputting to the print unit control unit 20a.

The printer 11 according to this embodiment of the disclosure can print based on the print data after executing a process dependent on the type of print data by the simple means of communicating the print data through a first data processing unit 62 as a first channel or a second data processing unit 63 as a second channel according to the type of print data. More specifically, the printer 11 can execute an appropriate process according to the type of print data by a simple means.

The data process executed by the first data processing unit 62 as a first channel in this embodiment is a decryption process that decrypts encrypted print data, and when the received print data is encrypted data, the communication unit 60 passes the encrypted data through the first data processing unit 62 and decrypts the encrypted data.

This embodiment of the disclosure can thus print based on print data that requires decrypting by first appropriately decrypting the encrypted print data bypassing it through the first data processing unit 62.

Applications of the Disclosure

The disclosure can be applied as described below.

The disclosure is described above using as examples of plural channels a first logical communication channel K1 that carries encrypted data and a second logical communication channel K2 that carries unencrypted data.

However, processes such as described below can also be executed by applying the technical concept of the disclosure, that is, opening a plurality of communication channels for communicating different types of data between a printer and a control device that generates and sends data using a function of a browser. This enables achieving the effect of diversifying the methods of data communication according to the type of data, and communicating data by methods appropriate to the type of data.

Application 1

Plural communication channels for communicating data compressed with different compression rates for communication are opened between the browser execution unit 26*a* and communication unit 20*b*. The appropriate communication channel is then appropriately selected and data is communicated based on the communication speed, current communication traffic, CPU power, and the load on the CPU. The data transmitted in a compressed form is then decompressed by the printer. This configuration enables applying data compression with the desirable compression rate and communicating data according to the actual system environment and operating conditions.

Application 2

Plural communication channels for communicating data related to device control to a plurality of devices connected to the printer 11 are opened between the browser execution unit 26*a* and communication unit 20*b*. The browser execution unit 26*a* then changes the communication channel and transmits data depending on the device to be controlled. By thus changing the communication channel according to the device, control data can be output to the appropriate device.

The disclosure being thus described, it will be obvious that the disclosure can be varied in many ways.

For example, the control system 1 according to the disclosure is described using a POS system as an example in the foregoing embodiments, but the disclosure is not limited to a POS system.

The function blocks shown in FIG. 2 can be achieved by the cooperation of hardware and software, and do not suggest a specific hardware configuration.

Operations including the operations described in the flow charts shown in FIG. 4 and FIG. 6 can also be achieved by the devices running an appropriate program stored on an external storage medium.

Such variations are not to be regarded as a departure from the spirit and scope of the disclosure, and all such modifications as would be obvious to one skilled in the art are intended to be included within the scope of the following claims.

A printing device according to one aspect of the disclosure includes a communication unit that has a first channel that executes a data process and a second channel different from the first channel, and communicates print data on the first channel or the second channel; and a print unit that prints based on the print data communicated on the first channel or the second channel of the communication unit.

By communicating print data through a first channel or second channel depending on the type of print data, the printing device in this aspect of the disclosure can print based on the print data after executing a process appropriate to the type of print data. More specifically, the printing device can execute an appropriate process by a simple means according to the type of print data.

In a printing device according to another aspect of the disclosure, the data process executed on the first channel is a decryption process that decrypts the encrypted print data; and the communication unit communicates the print data on the first channel when the received print data is encrypted and decrypts the encrypted data.

By transmitting print data that requires decryption over the first channel, this aspect of the disclosure enables appropriately decrypting the print data and then printing based on the decrypted print data.

Another aspect of the disclosure is a control system including: a control device having a browser execution unit that runs a web browser, and transmitting print data output by the browser execution unit on a first communication channel or a second communication channel; and a printing device having a communication unit that receives the print data transmitted by the control device on the first communication channel or second communication channel, and executes a process appropriate to the first communication channel or second communication channel, and a print unit that prints based on the print data received by the communication unit.

The control device in this aspect of the disclosure transmits over the first communication channel or second communication channel according to the type of data, and the printing device receives the print data and then prints after processing the received data appropriately to the communication channel. As a result, if the control device and printing device communicate over the first or second communication channel appropriately to the type of print data, the printing device can execute a process corresponding to the type of print data and print appropriately.

Further preferably, the control device encrypts the print data and transmits the encrypted print data on the first communication channel; and the printing device decrypts the print data transmitted on the first communication channel.

By transmitting print data that requires encryption over the first communication channel, and print data that does not require encryption over the second communication channel, this aspect of the disclosure enables the control device and printing device to easily switch between encrypting data and not encrypting data for communication.

In a control system according to another aspect of the disclosure, the control device and the printing device store encryption information related to encrypting the print data; the control device encrypts the print data based on the stored encryption information and transmits the encrypted print data on the first communication channel; and the printing device decrypts the print data transmitted on the first communication channel based on the stored encryption information.

This aspect of the disclosure enables appropriate encryption and decryption of data passing through the first communication channel by the control device and printing device.

In a control system according to another aspect of the disclosure, the print unit of the printing device converts the decrypted print data to a control command that controls the print unit, and prints based on the converted control command.

This aspect of the disclosure enables printing appropriately.

Another aspect of the disclosure is a control method of a control system, the control method including steps of: a control device transmitting print data to a printing device on a first communication channel that performs a data process on the print data or a second communication channel that performs a data process different from the data process performed on the first communication channel; and the printing device printing based on the print data transmitted on the first communication channel or the second communication channel.

By communicating print data through a first channel or second channel depending on the type of print data, the control method according to this aspect of the disclosure enables the printing device to print based on the print data after executing a process appropriate to the type of print data. More specifically, the printing device can execute an appropriate process by a simple means according to the type of print data.

Another aspect of the disclosure is a program that causes a printing device to receive print data over a first communication channel that processes the received print data or a second communication channel different from the first communication channel, and to print based on the print data received over the first communication channel or the second communication channel.

By the simple means of communicating over a first communication channel or a second communication channel according to the type of print data, the program according to this aspect of the disclosure enables the printing device to process the received data appropriately to the type of print data and then print based on the print data. More specifically, the printing device can easily execute a process appropriate to the type of print data.

Another aspect of the disclosure is a method of controlling a control system having a printing device and a control device that can communicate with the printing device, wherein the control device transmits print data output by a browser execution unit that runs a web browser through a first communication channel or a second communication channel, and the printing device receives the print data sent by the control device through the first communication channel or second communication channel, processes the data as required according to the communication channel that was used, and prints based on the received print data.

By the simple means of communicating through a first channel or second channel depending on the type of print data, the printing device in this aspect of the disclosure can print based on the print data after executing a process appropriate to the type of print data. More specifically, the printing device can execute an appropriate process by a simple means based on the type of print data.

Other objects and attainments together with a fuller understanding of the disclosure will become apparent and appreciated by referring to the following description and claims taken in conjunction with the accompanying drawings.

What is claimed is:

1. A control system comprising:
   a hardware controller that runs a web browser, encrypts select print data output by the web browser, does not encrypt other print data output by the web browser, and transmits the encrypted print data and the non-encrypted print data on a transmission channel; and
   a printer including a receiver and a print controller, wherein:
      the receiver receives the encrypted print data and the non-encrypted print data transmitted by the hardware controller on the transmission channel;
      the receiver includes a first reception channel and a second reception channel different from the first reception channel;
      the received encrypted print data is directed to the first reception channel and the received non-encrypted data is directed to the second reception channel, the first reception channel being a WebSocket channel and the second reception channel not being a WebSocket channel;
      the first reception channel decrypts the received encrypted data;
      the receiver communicates the decrypted print data from the first reception channel and the non-encrypted data from the second reception channel; and
      the print controller controls printing based on the decrypted print data communicated from the first reception channel and the non-encrypted print data communicated from the second reception channel of the receiver; and
   wherein prior to transmitting the encrypted print data and the non-encrypted print data, the hardware controller adds a flag indicator to the encrypted print data and to the non-encrypted print data identifying it as encrypted print data or non-encrypted print data, respectfully.

2. The control system described in claim 1, wherein:
   the hardware controller and the printer store encryption information related to encryption of the print data;
   the hardware controller encrypts the select print data based on the stored encryption information; and
   the printer decrypts the received encrypted print data in the first reception channel based on the stored encryption information.

3. The control system described in claim 1, wherein:
   the print controller converts the decrypted print data to a control command to control the print controller, and print based on the converted control command.

4. The control system described in claim 1, wherein:
   the hardware controller compresses the encrypted print data at a first compression rate and transmits the compressed encrypted print data on the transmission channel.

5. The control system described in claim 4, wherein
   the hardware controller compresses the non-encrypted print data at a second compression rate that is different from the first compression rate, and transmits the compressed non-encrypted print data on the transmission channel.

6. The control system described in claim 5, wherein:
   the printer is coupled to a data hardware processor different from the hardware controller; and
   the hardware controller transmits data for the data hardware processor connected to the printer on the transmission channel.

7. The control system described in claim 1, wherein:
   the printer is connected to a host computer via the hardware controller; and
   the hardware controller transmits data from the host computer to the printer on the transmission channel.

8. The control system described in claim 1, wherein:
   the hardware controller is a POS terminal having a display that displays product information; and
   the printer produces a receipt based on information processed by the POS terminal.

9. The control system described in claim 1, wherein the receiver inspects the flag indicator of the received encrypted print data and the received non-encrypted print data, and directs the received encrypted print data and non-encrypted print data to the appropriate one of the first reception channel and second reception channel based on the flag indicator.

10. The control system described in claim 1, wherein:
    said encrypted print data and said non-encrypted print data are each print jobs controlling printing by said printer;
    said flag is embedded within the encrypted print data and within the non-encrypted print data;
    if the flag identifies print data received by the printer as encrypted print data, then the receiver directs the received print data to the first reception channel; and
    if the flag identifies print data received by the printer as non-encrypted print data, then the receiver directs the received print data to the second reception channel.

11. The control system described in claim 1, wherein:
    the first reception channel is based on a WebSocket protocol and the second reception channel is based on an HTTP protocol.

12. The control system described in claim 1, wherein:
the printer generates an encoding key in the absence of any issuance of a digital certificate from an external authority, and sends the encoding key on the transmission channel to the hardware controller via the WebSocket channel; and
the hardware controller uses the received encoding key to encode to encrypt the select print data.

13. A control method of a control system, comprising:
a hardware controller transmitting print data via a transmission channel, the transmission channel transmitting encrypted print data and non-encrypted print data; and
a printer printing based on the encrypted print data and the non-encrypted print data transmitted on the transmission channel; wherein:
the transmitted encrypted print data and the transmitted non-encrypted print data include a flag indicator identifying it as encrypted print data or non-encrypted print data, respectfully; and
the printer distinguishes between received encrypted print data and received non-encrypted print data based on their flag indicator, and directs encrypted print data to a WebSocket channel of the printer and directs non-encrypted print data to a non-WebSocket channel of the printer.

14. The control method of the control system described in claim 13, wherein:
the WebSocket channel is a first reception channel based on a WebSocket protocol for receiving the encrypted print data transmitted on the transmission channel and decrypting the received encrypted print data; and
the printer prints based on the decrypted print data.

15. The control method of the control system described in claim 14, wherein:
the non-WebSocket channel is a second reception channel based on an HTTP protocol for receiving the non-encrypted print data transmitted on the transmission channel; and
the printer prints based on the received non-encrypted print data without decrypting print data received by the second reception channel.

16. The control method of the control system described in claim 13, wherein:
the hardware controller compresses the encrypted print data at a first compression rate, and
transmits the compressed encrypted print data on the transmission channel.

17. The control method of the control system described in claim 16, wherein:
the hardware controller compresses the non-encrypted print data at a second compression rate that is different from the first compression rate, and
transmits the compressed non-encrypted print data on the transmission channel.

18. The control method of the control system described in claim 13, wherein:
the encrypted print data and non-encrypted print data transmitted on the transmission channel are both print jobs;
the transmission channel embeds the flag into its transmitted print data identifying it as encrypted print data or non-encrypted print data;
if the flag embedded within printing data received by the printer identifies the received printing data as encrypted print data, then the printer decrypts the received print data prior to printing based on the received print data;
if the flag embedded within printing data received by the printer identifies the received printing data as non-encrypted print data, then the printer does not decrypts the received print data prior to printing based on the received print data.

19. A printer comprising:
a receiver and a print controller, wherein:
the receiver is configured to receive encrypted print data and non-encrypted print data transmitted on a transmission channel by a web browser;
the receiver includes a WebSocket reception channel and a non-WebSocket reception channel;
within the receiver the received encrypted print data is directed to the WebSocket reception channel and the received non-encrypted data is directed to the non-WebSocket reception channel;
the WebSocket reception channel decrypts the received encrypted data;
the receiver communicates to the print controller the decrypted print data from the WebSocket reception channel and the non-encrypted data from the non-WebSocket reception channel;
the print controller is configured to print based on the decrypted print data communicated from the WebSocket reception channel and the non-encrypted print data communicated from the non-WebSocket reception channel of the receiver; and
the received encrypted print data includes a first flag indicator identifying it as encrypted print data and the received non-encrypted print data includes a second flag indicator identifying it as non-encrypted print data.

20. The printer described in claim 19, wherein:
the WebSocket reception channel is based on a WebSocket protocol and the non-Web-Socket reception channel is based on an HTTP protocol.

* * * * *